United States Patent
Sasse et al.

(10) Patent No.: US 6,799,665 B1
(45) Date of Patent: Oct. 5, 2004

(54) HYDRODYNAMIC TORQUE CONVERTER

(75) Inventors: Christoph Sasse, Schweinfurt (DE); Wolfgang Kundermann, Schweinfurt (DE); Hans-Wilhelm Wienholt, Schweinfurt (DE); Wolfgang Gude, Niederwerrn (DE); Dietrich Bechmann, Röthlein (DE); Erwin Wack, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/493,327

(22) Filed: Jan. 28, 2000

(30) Foreign Application Priority Data

Feb. 5, 1999 (DE) ......................................... 199 04 857

(51) Int. Cl.$^7$ ............................................. F16H 45/02
(52) U.S. Cl. ..................... 192/3.28; 192/3.3; 192/220
(58) Field of Search ............................. 192/3.28, 3.3, 192/70.17, 212, 70.2; 475/59; 74/730.1

(56) References Cited

U.S. PATENT DOCUMENTS

| | | | |
|---|---|---|---|
| 4,671,062 A | * 6/1987 | Ohkubo | 60/362 |
| 4,706,790 A | * 11/1987 | Lockhart et al. | 192/3.3 |
| 4,889,012 A | * 12/1989 | Dull | 192/3.28 X |
| 5,020,646 A | * 6/1991 | Koshimo | 192/3.3 X |
| 5,417,315 A | * 5/1995 | Fukunaga | 192/3.3 |
| 5,511,640 A | * 4/1996 | Fukunaga | 192/3.28 |
| 5,964,329 A | * 10/1999 | Kawaguchi et al. | 192/3.3 |
| 6,142,272 A | * 11/2000 | Meisner et al. | 192/3.29 |

FOREIGN PATENT DOCUMENTS

| | | | |
|---|---|---|---|
| DE | 19722151 A1 | * | 12/1997 |
| DE | 197 24 973 | | 10/1998 |

* cited by examiner

Primary Examiner—Charles A. Marmor
Assistant Examiner—Saúl Rodríguez
(74) Attorney, Agent, or Firm—Cohen, Pontani, Lieberman & Pavane

(57) ABSTRACT

A hydrodynamic torque converter includes a converter housing and a turbine wheel which is arranged in the converter housing and is rotatable with respect to the converter housing about a rotational axis of the converter The torque converter further includes a lockup clutch for producing a torque transmission connection between the converter housing and the turbine wheel. The lockup clutch has a first friction surface arrangement held by a first friction surface carrier arrangement substantially fixed with respect to rotation relative to the converter housing, a second friction surface arrangement is held by a second friction surface carrier arrangement substantially fixed with respect to rotation relative to the turbine wheel, a contact pressing arrangement for pressing the first and the second friction surface arrangement against one another in fictional contact, and an abutment arrangement at which the first and second friction surface arrangement can be supported substantially in the direction of the aixis of rotation when pressed by the contact pressure arrangement. The first friction surface carrier arrangement has a substantially annular body region connected either directly or indirectly with the converter housing and driver projections which are arranged at a distance from one another in the circumferential direction proceeding from the body region. Respective counter-driver projections at the first friction surface arrangement engage between these driver projections.

4 Claims, 7 Drawing Sheets

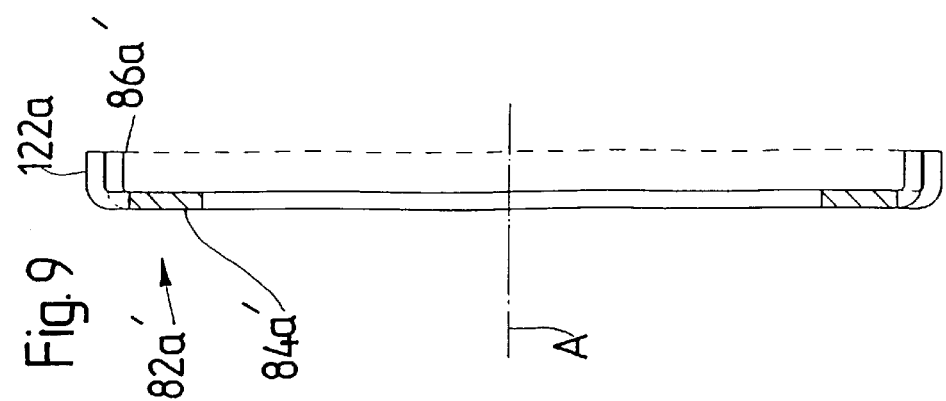
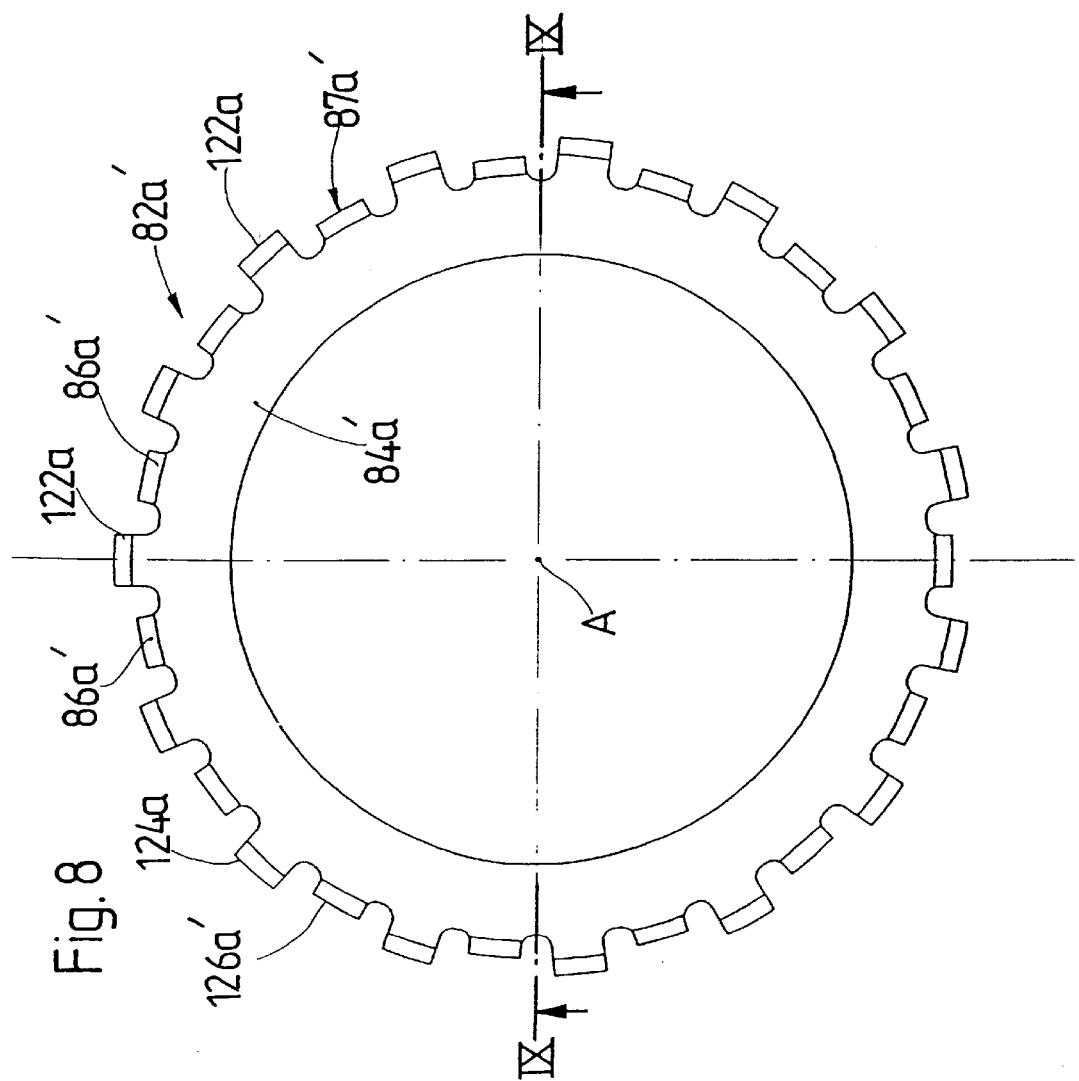

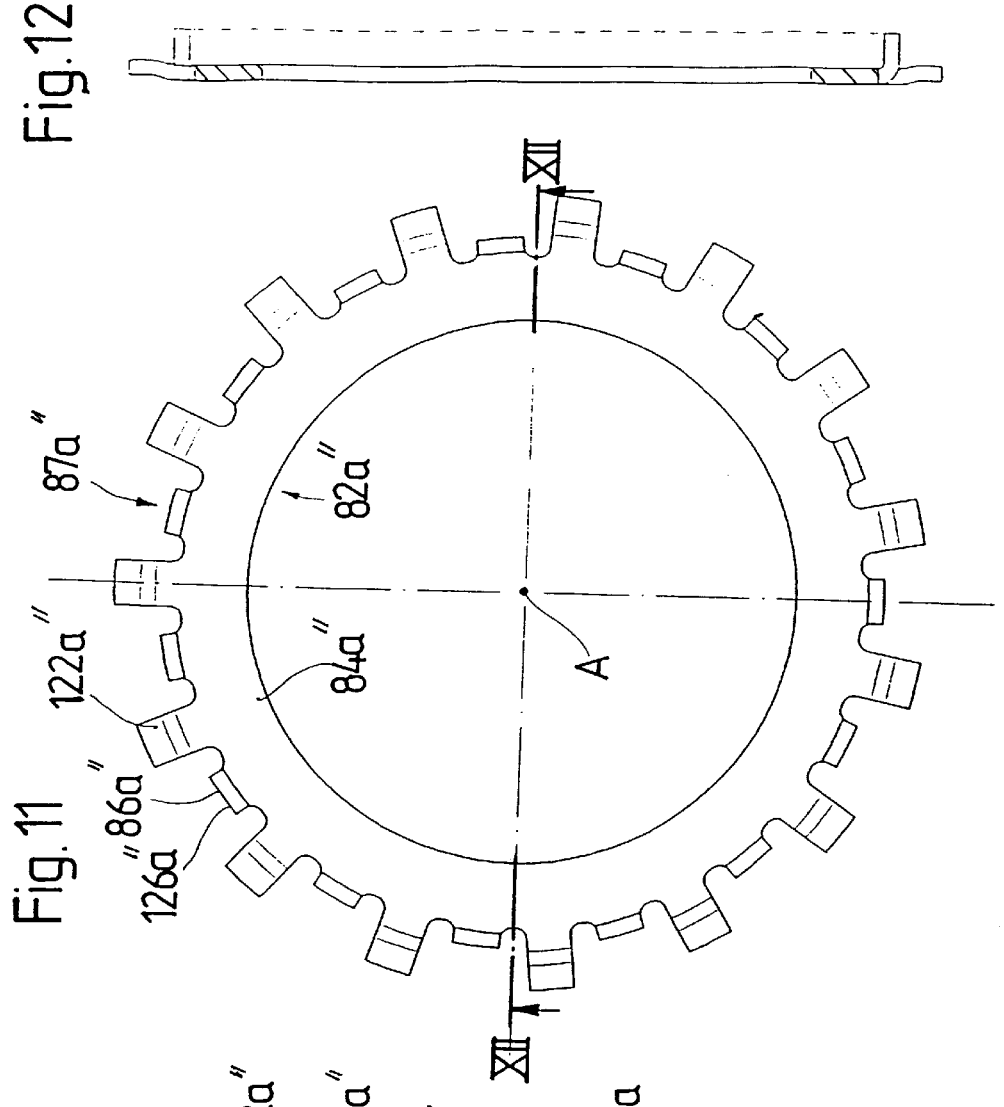

HYDRODYNAMIC TORQUE CONVERTER

BACKGROUND OF THE INVENTION

1. Field of the Invention

The present invention is directed to a hydrodynamic torque converter with a converter housing, a turbine wheel arranged in the convener housing that is rotatable with respect to the converter housing about a rotational axis, and a lockup clutch via which a torque transmission connection is producible between the converter housing and the turbine wheel, wherein the lockup clutch has a first friction surface arrangement which is held by a first friction surface carrier arrangement with respect to the converter housing so as to be substttantially fixed with respect to rotation relative to it, a second friction surface arrangement which is held by a second friction surface carrier arrangement with respect to the turbine wheel so as to be substantially fixed with respect to rotation relative to it, a contact pressing arrangement operative for pressing the first and the second friction surface arrangement against one another in frictional contact, and an abutment arrangement at which the first and second friction surface arrangement can be supported substantially in the direction of the axis of rotation when acted upon by the contact pressure arrangement and which optionally forms at least one part of one of the friction surface arrangements.

2. Description of the Related Art

A prior art hydrodynamic torque converter with a lockup clutch having a first friction surface arrangement, a second friction surface arrangement, a contact pressing arrangement and an abutment arrangement is disclosed in German reference DE 197 24 973 C1. A lockup clutch of this torque converter comprises an outer plate set (first friction surface arrangement) and an inner plate set (second friction surface arrangement). The outer plate set is joined, via an outer plate carrier, to the converter housing so as to be fixed with respect to rotation relative to it, but is held therein so as to be axially displaceable. The outer plate carrier is constructed as a substantially annular structural component part which is welded by one axial end face to an inner surface of the converter housing. A toothing is formed by non-cutting shaping at an inner surface of the outer plate carriers wherein corresponding teeth or projertions at the outer plates and an abutment part engage in this toothing to provide a rotational coupling.

A problem arising in torque converters of the type mentioned above is that the welding process for connecting the outer and inner plate carriers requires carrying out subsequent machining procedures, e.g., reworking in the area of the weld. Another problem is that the design of the torque convener must allow fluid to pass trough the lockup clutch even when a torque trasmission connection is produced via the lockup clutch. Accordingly, openings must be introduced in the outer circumferential area of the outer plate carrier in this known torque converter which constitutes an additional work step which is difficult to carry out.

SUMMARY OF THE INVENTION

It is the object of the present invention to provide a hydrodynamic torque converter in which ensures that fluid is allowed to pass through the lockup clutch and that is simple to assemble, According to the invention, the object is met by a hydrodynamic torque converter with a converter housing, a turbine wheel which is arranged in the converter housing and is rotatable with respect to this converter housing about a rotational axis, and a lockup clutch for producing a torque transmission connection between the converter housing and the turbine wheel, wherein the lockup clutch comprises a first friction surface arrangement which is held by a first friction surface carrier arrangement with respect to the converter housing so as to be substantially fixed with respect to rotation relative to it, a second friction surface arrangement which is held by a second friction surface carrier arrangement with respect to the turbine wheel so as to be substantially fixed with respect to rotation relative to it, a contact pressing arrangement for pressing the first and the second friction surface arrangements against one another in frictional contact, and an abutment arrangement at which the first and second friction surface arrangement are supported substantially in the direction of the axis of rotation when acted upon by the contact pressure arrangement and which optionally forms at least one part of one of the first and second friction surface arrangements.

It is further provided that the first friction surface carrier arrangement has a substantially annular body region connected with the converter housing or with a component connected with the converter housing. Driver projections are arranged at a distance from one another in the circumferential direction proceeding from the body region, wherein respective counter-driver projections at the first friction surface arrangement engage between these driver projections.

According to the present invention, the outer plate carrier, i.e., the first friction surface carrier arrangement, is not constructed as an axially continuous annular part. Rather the annular area of the annular body is limited to a certain length and driver projections proceed from this length, wherein gaps are fanned between the driver projections. The fluid flowing into the interior of the converter is allowed to pass through these gaps. Furthermore, this through-flow is substantially not dependent on whether or not the lockup clutch is engaged. Accordingly, a suitable flow around the friction surface arrangements is ensured in every case, so that increased performance is achieved particularly when the lockup clutch slips.

The driver projections preferably extend approximately axially. Centering is achieved in the area of the lockup clutch in a particularly simple and accurate mariner when an outer surface of the annular body region contacts an inner surface of the converter housing and/or a component connected therewith and the outer surface of the annular body region is connected with the converter housing and/or with the component connected therewith in the region of these surfaces.

For the axial support of the respective friction surface arrangements, the abutment arrangement, i.e., an abutment ring, may be supported at the driver projections in an end area of the driver projections remote of the annular body region.

Alternatively, the abutment arrangement may comprise a substantially annular abutment part with a radial outer region of the abutment arrangement secured to the converter housing and/or the component connected therewith. The radial inner side of the abutment arrangement forms an abutment area for the first and second friction surface arrangement. Accordingly, the abutment arrangement and the friction surface carrier arrangement are structural component parts that are separate from one another in this embodiment. This arrangement simplifies the compaction of the individual structural component parts in themselves. In particular, the desired fled passage may be maintained by introducing holes in the abutment arrangement.

The abutment ring may be connected with a substantially radially extending area of the converter housing and/or a component connected therewith to join the abutment ring to the converter.

The first friction surface carrier arrangement may assume a dual function, For example, the first friction surface carrier arrangement may form a radial supporting surface in the annular body region and/or an axial guide surface for the contact pressure arrangement.

In an alternative embodiment of the present invention, the object of the present invention is met in that the first friction surface carrier arrangement has an annular body region which forms the abutment arrangement and it which a connection area is provided in a radial outer region for connecting with the converter housing and/or with the component connected therewith.

In this case, the connection area may comprise a radial outer portion of the annular body region. A plurality of driver openings are formed in a successive arrangermet along the circumferential direction in which respective couter-driver projections of the first friction surface arrangement engage to provide a simple rotational coupling of the first friction surface arrangement at the first friction surface carrier arrangement and to allow the desired flow of fluid.

In a modified embodiment form, a plurality of driver projections which preferably extend substantially axially are arranged at a distance from one another along the circumference and proceed from the annular body region. Respective counter-driver projections of the first friction surface arrangement engage between tile driver projections.

To center the first friction surface carrier arrangement with respect to the converter, an outer surface of the driver projections may contact an inner surface of the converter housing and/or the component connected therewith.

In this embodiment, the driver projections may also form the connection area such that the outer surfaces of the drive projections are connected with the oppositely located inner surface of the converter housing and/or the component connected therewith. This connection is preferably by welding.

In addition to the driver projections, a plurality of fastening projections may also be arranged at a distance from each other along the circumferential direction in alternate succession with the driver projections and proceeding from the annular body to secure the first friction surface carrier arrangement to the converter. The fastening projections are secured to the converter housing and/or to the component connected therewith and form the connection area.

To ensure that the other components of the lockup clutch and particularly the friction surface arrangements are impaired as little as possible when carrying out the connection process and that those components ensuring the rotational driving of the first friction surface arrangement are impaired as little as possible, the fastening projections extend substantially parallel to the driver projections such that outer surfaces of the fastening projections are at a greater radial distance from the axis of rotation than outer surfaces of the driver projections. The outer surfaces of the fastening projections are secured to an inner surface of the converter housing and/or to the component connected therewith In an alternative embodiment, the fastening projections may be secured to a surface region of the converter housing and/or of the component connected therewith that extends substantially radially or at a substantial inclination relative to the axis of rotation. This embodiment ensures that the friction surface arrangements are influenced as little as possible by the connection process.

In another embodiment, the friction surface arrangement may be centered with respect to the converter with a positioning shoulder provided at the converter housing and/or at the component connected therewith. This embodiment permits a relative positioning of the first friction surface carrier arrangement with respect to the converter housing.

Laser welding of the first friction surface carrier arrangement with the converter housing and/or with the component connected therewith ensures on the one hand that the connection process is carried out with high precision and, on the other hand, a deformation of the components to be connected with one another is prevented as far as possible by minimizing the heat energy introduced in the material to be welded. Therefore, it is unnecessary in practice to car out any subsequent machining processes after the various components have been connected by laser welding.

The laser welding connection between the first fiction surface carrier arrangement and the converter housing and/or the component connected therewith is preferably carried out at or proximate to a curvature area of the converter housing and the component connected therewith. The curvature area is preferably a transitional area between a substantially radially extending portion and a substantially axially extending portion of the converter housing and the component connected therewith. The location of die welding area in the area of surface regions which run into one another results in a focusing effect, especially for a laser welding process, which increases the efficiency of the welding process.

Furthermore, a supporting element may be provided in the torque converter according to the invention which supports a radial inner side of the contact pressure arrangement and/or on which the contact pressure arrangement is guided so as to be movable in the axial direction. The supporting element is secured by laser welding to the converter housing and/or the component connected therewith. Since this supporting element is also secured by laser welding, the connection process may be carried out simultaneously with the connection of the first friction surface carrier arrangement with. the converter housing or with the component connected therewith.

The present invention is further directed to a friction surface carrier arrangement for a friction surface arrangement of a lockup clutch of a hydrodynamic torque converter, wherein the friction surface carrier comprises a substantially annular body region and a plurality of driver projections which proceed from the substantially annular body region and are arranged at a distance from one another in the circumferential direction and engage via a meshed engagement with counter-driver projections of the friction surface arrangement.

According to an alternative embodiment, the present invention is directed to a surface friction carrier arrangement for a friction surface arrangement of a lockup clutch of a hydrodynamic torque converted comprising an annular body region having a radial inner area which forms an abutment arrangement for the friction surface arrangement and a radial Outer area for securing to a component of the torque converter, wherein a plurality of driver openings constructed in the annular body region are arranged successively in the circumferential direction, wherein respective counter-driver projections of a friction surface arrangement can engage in the driver openings.

The various features of novelty which characterize the invention are pointed out with particularity in the claims annexed to and for a part of the disclosure. For a better understanding of the invention, its operating advantages, an specific objects attained by its use, reference should be had to the drawing and descriptive matter in which there are illustrated and described preferred embodiments of the invention

BRIEF DESCRIPTION OF THE DRAWINGS

In the drawings, wherein like reference characters denote similar elements throughout the several views;

FIG. 8 is an axial view of the outer plate carrier used in the lockup clutch of FIG. 7;

FIG. 9 is a sectional view of the outer plate carrier of FIG. 8 along a line IX—IX in FIG. 8;

FIG. 10 is a detailed sectional view of a lockup clutch according to another embodiment of the present invention;

FIG. 11 is an axial view of the outer plate carrier used in the lockup clutch of FIG. 10;

FIG. 12 is a sectional view of the outer plate carrier of FIG. 11 along a line XII—XII;

DETAILED DESCRIPTION OF THE PRESENTLY PREFERRED EMBODIMENTS

Figure 1:
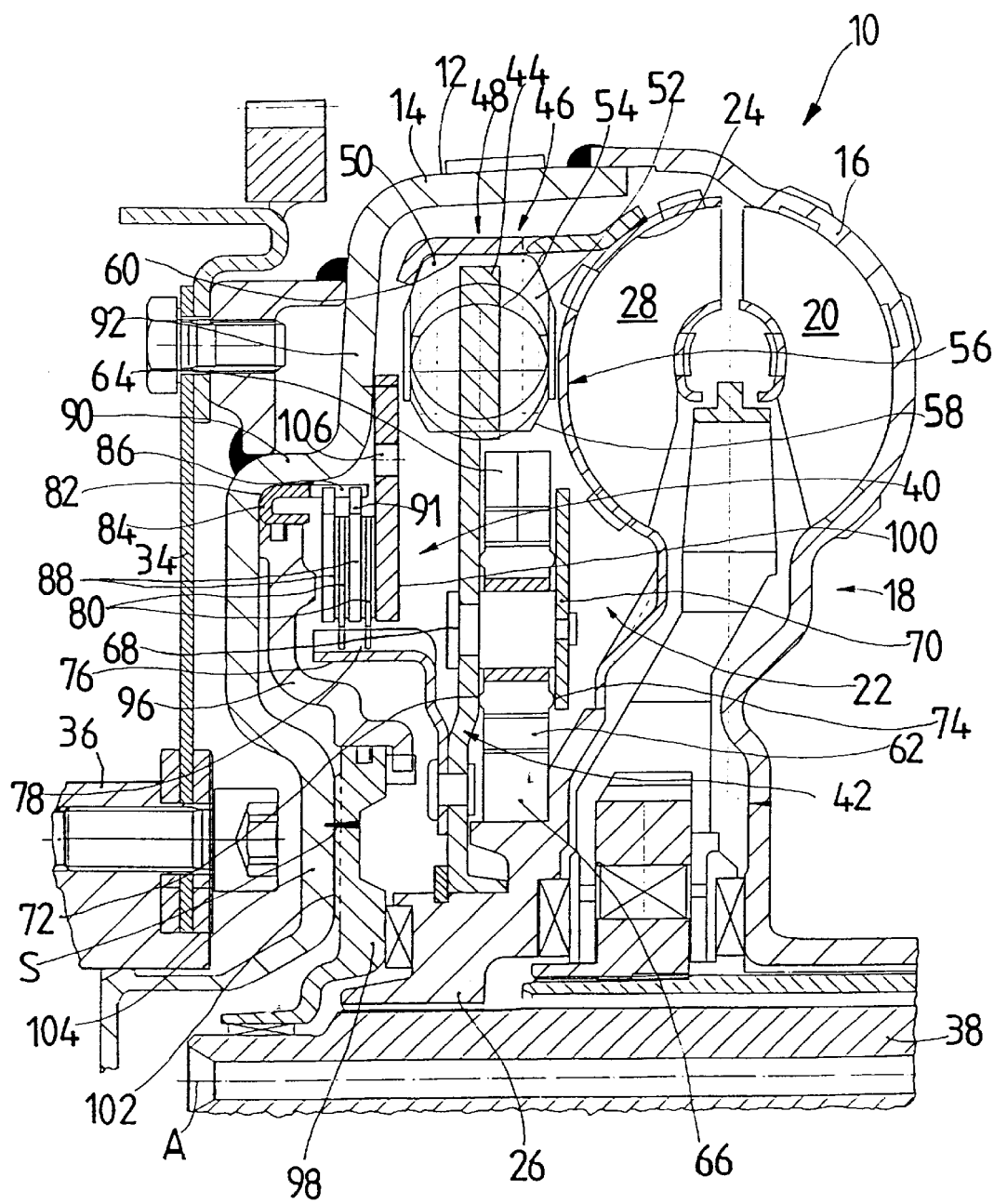
FIG. 1 is a partial longitudinal section view through a hydrodynamic torque converter with a lockup clutch according to a first embodiment of the present invention.

FIG. 1 shows a partial longitudinal section a hydrodynamic torque converter 10 according to an embodiment of the present invention. Me construction of the torque converter is known in principle and will be described briefly in the following. The torque converter 10 has a s housing 12 including a housing cover 14 and an Impeller wheel shell 16 of an impeller wheel 18. The connection of the impeller wheel shell 16 to the housing cover 14 is made by welding. The impeller wheel shell 16 carries a plurality of impeller wheel blades 20 along an inner side. A turbine wheel 22 is arranged in the interior of the torque converter 10 and includes a turbine wheel shell 24 and a turbine wheel hub 26.

A plurality of turbine wheel blades 28 are positioned in a successive manner in the circumferential direction in the turbine wheel shell 24. A stator wheel 30 having a plurality of stator wheel blades 32 is located between the turbine wheel 22 and the impeller wheel 18.

The converter housing 12 is coupled via a flex-plate 34 with a drive shaft such, for example, as an engine crankshaft 36 (the engine crankshaft is indicated only schematically) so that the converter housing 12 is fixed with respect to rotation relative to the engine crankshaft 36. The output of the torque converter 10 forms a transmission input shaft 38 which is coupled with the turbine wheel hub 26 so that the transmission input shaft 38 is fixed with respect to rotation relative to the turbine wheel hub 26. Furthermore, a lockup clutch 40 is arranged in the torque converter 10 with a clutch piston 96, wherein a direct torque transmission connection between the housing cover 14 and the turbine wheel 22 may be produced by the lockup clutch 40 via a displacement of a clutch piston 96. In the torque converter 10 of FIG. 1, the direct torque transmission connection is produced between the housing cover 14 and the turbine wheel shell 24 of the turbine wheel 22. For effecting this connection, the lockup clutch 40 is fixedly connected with a hub disk 42 of the torsional vibration damper 46, wherein the hub disk 42 has a plurality of supporting areas 44 distributed in the circumferential direction in a manner known per se at its radial outer area.

The torsional vibration damper 46 further has a component group 48 connected with the turbine wheel shell 24 having corresponding supporting areas 50, 52 associated with each supporting area 44 of the hub disk 42. Accordingly, when the torsional vibration damper 46 is unloaded, the three supporting areas 50, 44, 52 are located adjacent to one another in the axial direction of a rotational axis A of the torque converter 10. Springs 54 (indicated schematically) of a respective damper spring unit 56 are located in a manner known per se in spring windows formed between groups of supporting areas 50, 44, 52 which follow one another in the circumferential direction Each of these damper spring units 56 accordingly comprises at least one spring 54 of the type mentioned above. One of the end areas of the damper spring unit 56 is supported via spring bushings or spring shoes 58, as they are called, at a first group of supporting areas 50, 44, 52, and a second end area of the damper spring unit 56 is supported via a corresponding spring shoe 58 at a group of supporting areas 50, 44, 52 following in the circumferential direction. During a relative rotation between the hub disk 42 and the component group 48, one of the spring shoes 58 associated with a respective damper spring unit 56 is driven or carried along by a supporting area 44 and the spring shoe 58 positioned at the other end of the damper spring unit 56 is driven by the supporting areas 50, 52 of the group of supporting areas directly following the latter. It is noted that each of these damper spring units 56 positioned between successive groups of supporting areas may comprise a plurality of springs 54, wherein directly successive springs are then preferably supported against one another via sliding blocks or sliding shoes (not shown), as they are called, wherein the sliding shoes essentially correspond to the construction and function of the spring shoes 58.

The constructional group 48 of the torsional vibration damper 46 having the respective partial areas 50, 52 is joined to a radial outer area of the turbine wheel shell 24 by laser welding, for example, or another type of welding. Furthermore, FIG. 1 shows tat the radial inside end of the hub disk 42 is held in a fixed axial position on the turbine wheel hub 26, but is rotatable relative to the turbine wheel hub 26. When torsional vibrations occur during operation, the elasticity of the torsional vibration damper 46 allows the entire turbine wheel 22 to rotate relative to the hub disk 42 and relative to the lockup clutch 40 which is fixedly coupled with the hub disk 42.

Furthermore, a plurality of planet gears 62 are mounted on the hub disk 42 at locations distributed along the circumferential direction so that the planet gears 62 are rotatable. The radial outer sides of the planet gears 62 are in a meshed engagement with a floating ring gear 64 and the radial inside of the planet gears 62 mesh with a sun gear 66 secured to the turbine wheel hub 26. When the hub disk 42 rotates with respect to the turbine wheel hub 26 due to the elasticity of the torsional vibration damper 46, the planet gears 62 arranged successively in the circumferential direction are compulsorily driven in rotation which, in turn, produces a rotating movement of the floating ring gear 64. The rotation of the planet gears 62 and ring gear 64 absorbs a determined portion of the occurring torsional vibration energy.

Each of the planet gears 62 is rotatably supported at the hub disk 42 on a beating pin 68 with a bearing unit such, for example, as a sliding bearing intermediate said bearing pin 68 and said planet gear 62. Further, a supporting disk 70 with an annular shape is secured to the bearing pin 68 at a side of the planet gears 62 axially remote of the hub disk 42. Accordingly, the individual planet gears 62 are held axially between the hub disk 42 and the ring 70. For this purpose, the planet gears 62 have lateral bulges 72, 74 at their radial inner areas. The lateral bulges 72, 74 preferably extend annularly on each of the planet gears 62 and are formed integral with the planet gears 62 during the manufacturing process.

The lockup clutch 40 comprises an inner plate carrier 76 with a toothing configuration 78 on its radial outer surface which extends along the axial direction of the torque converter 10. The inner plate carrier 76 is fixedly connected with the hub disk 42 by a plurality of bolts or pins Two inner plates 80 are held at the inner plate carrier 76 with a counter-toothing configuration so that the two inner plates 80 are fixed with respect to rotation relative to the inner plate carrier 76 and axially displaceable thereto. The inner plates 80 from a friction surface arrangement which is coupled with the turbine wheel 22 via the torsional vibration damper 46 so that the inner plates 80 are fixed with respect to rotation relative to the turbine wheel 22. The lockup clutch 40 also comprises an outer plate carrier 82 which has an annular body region 84 with a U-shaped cross section. The outer plate carrier comprises a plurality of driver projections 86 proceeding from a radial outer one of the two U-legs of the annular body region 84 in the axial direction. The individual driver projections 86 are distributed in the circumferential direction and openings are formed between them. Counter-driver projections 91 provided at outer plates 88 engage the openings and form a connection between the outer plates 88, which form another friction surface arrangement, and the outer plate carrier 82 so as to be fixed with respect to relative rotation. FIG. 1 shows that an outer surface of the outer plate carrier 82 contacts an inner surface of a substantially cylindrical portion 90 of the housing cover 14. This cylindrical portion 90 forms an annular bulge region at the converter housing 12 to provide sufficient installation space for receiving the lockup clutch 40 and is connected to a radially extending portion 92 of the housing covet 14.

In the area of mutual contact between the outer portion of the body region 84 and inner surface of the cylindrical area 90 of the housing cover 14, the outer plate carrier 82 is fixedly connected with the housing cover 14 by welding. More specifically, a laser welding process is preferably used in this case, wherein, due to the curved transitional area of the cylindrical portion 90 leading into the substantially radially extending portion 92 of the housing cover 14 and due to the fact that the driver projections 86 extend substantially axially, a focusing effect is produced for the laser welding light which is radiated approximately axially.

The lockup clutch 40 further comprises the clutch piston 96 which is axially movably guided on a supporting element 98 so that a radial inner side of the clutch piston 96 is sealed and a radial outer side of the clutch piston 96 is supported at an inner surface of the body region 84 of the annular outer plate carrier 82 and axially guided in a sealed manner. By adjusting the pressure ratio in the interior of the hydrodynamic torque converter 10 on the one hand and in a fluid chamber area formed between the piston 96 and housing cover 14 on the other hand, the piston 96 is displaced axially, so that it presses against the first outer plate 88 located next to it and in this way presses the outer plates 88 and the inner plates 80 together with the intermediary of friction facing which may be provided at the latter. Further, an annular abutment clement 100 has an abutment at a radial inner end for contacting the last inner plate 80, so that the axial movement of the outer plates 88 and inner plates 80 is stopped when pressed toward the abutment element 100 by the clutch piston 96. The radial outer side of the annular abutment element 100 is secured to the radially extending portion 92 of the housing cover 14, for example, at two weld seams or at two rows of weld points by laser welding. One of these weld seams or rows of welds may serve as a temporary arrangement and the others for the final arrangement.

The supporting element 98 is welded to a substantially radial extending area 104 at a radial inner side of the housing cover 14. The welding may, for example, comprise laser welding and is indicated by line S. A fluid flow duct configuration 102, indicated by a dashed line, extends through the supporting element 98 to introduce fluid into the area between the clutch piston 96 and the housing cover 14 or drain fluid from this area. During assembly, the outer plate carrier 82 and the supporting element 98 may be secured to the housing cover 14 in a clamping process by the same tool, namely, a welding laser. The outer plates 88 and inner plates 80 are then installed and the abutment element 100 is likewise welded by a laser welding device. Due to the relatively small amount of heat energy introduced by laser welding into We material to be welded, none of these welding processes requires subsequent machining or subsequent cleaning.

The embodiment of the hydrodynamic torque converter 10 shown in FIG. 1 has the advantage that it has a relatively simple construction and requires only a few structural component parts in the area of the clutch, especially in the region of the outer plate carrier 82. Furthermore, the parts that are used are simple to produce. For example, the outer plate carrier 82 may be produced by a deep-drawing process, while the abutment element 100 can be produced by stamping. Furthermore, a plurality of fluid through-openings 106 may be distributed in the circumferential direction in the abutment element 100, thereby allowing fluid to flow through these fluid through-openings 106 into the area of the outer plates 88 and inner plates 80 so that a good cooling of these plates is ensured in this case, which is important particularly in slip operation of the lockup clutch 40.

Figure 3:
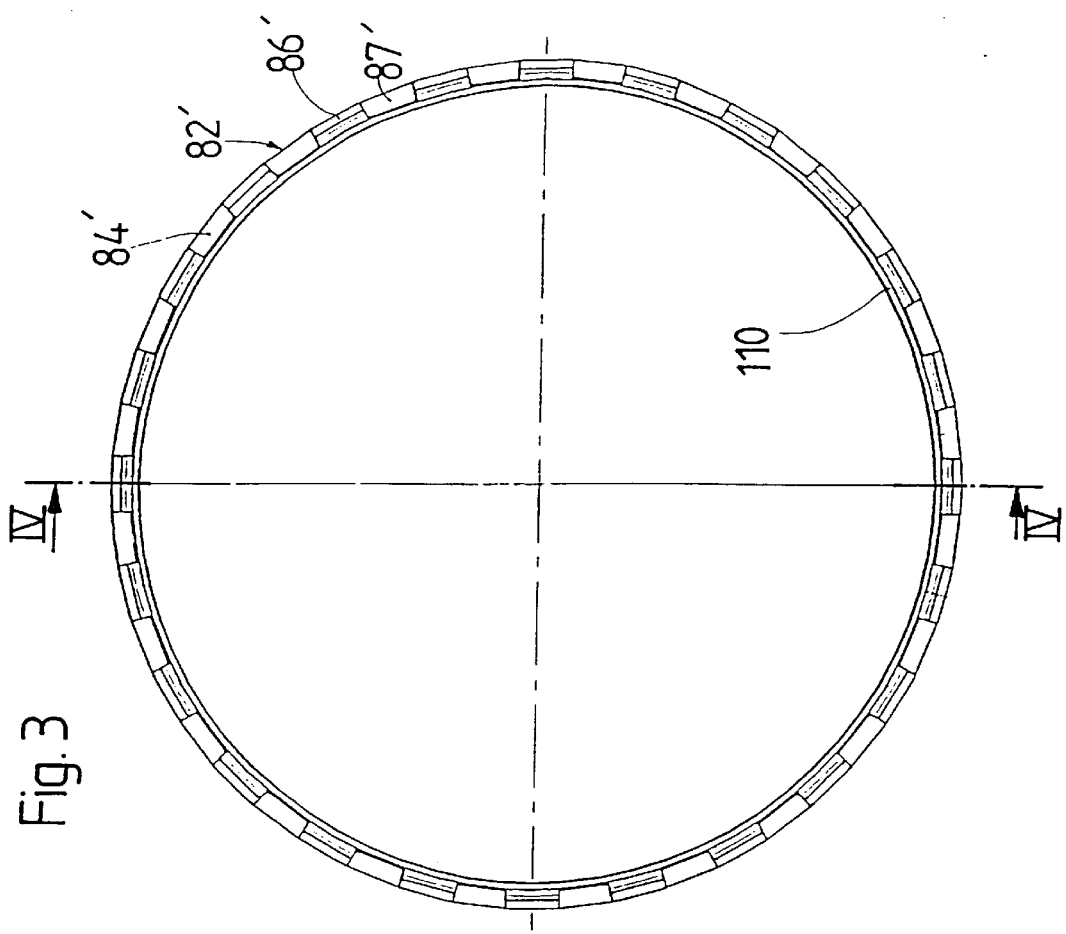
FIG. 3 is an axial view of the outer plate carrier used in the lockup clutch of FIG. 2.
Figure 2:
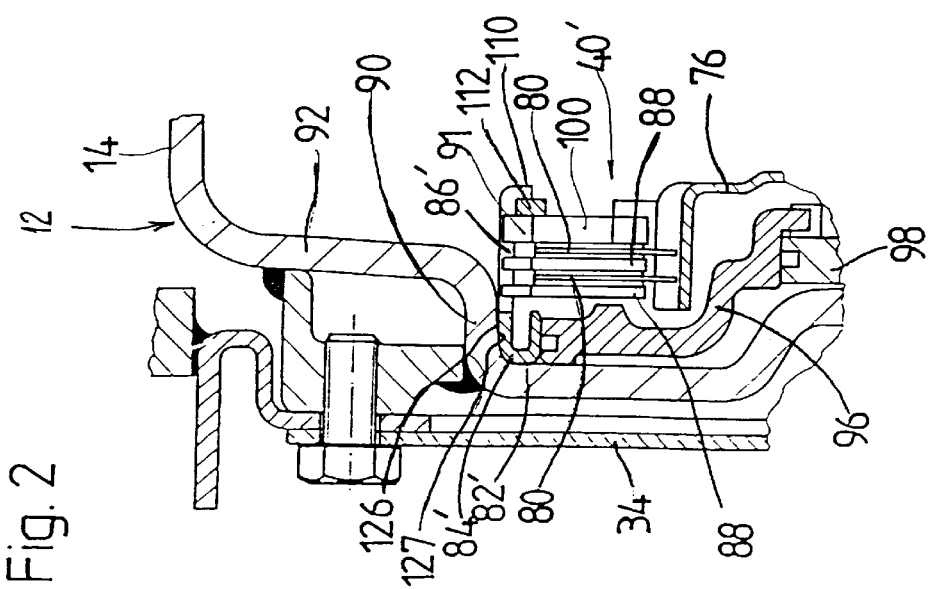
FIG. 2 is a detailed sectional view of a lockup clutch according to another embodiment of the present invention.
Figure 4:
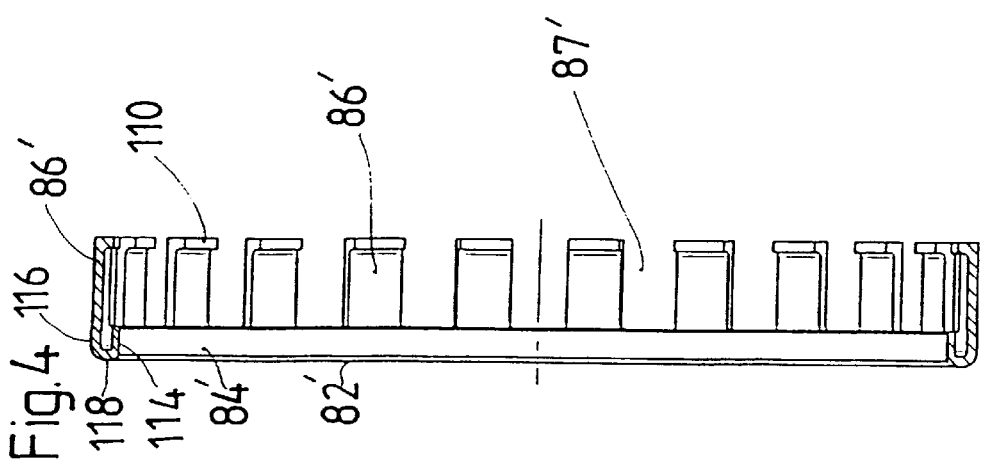
FIG. 4 is a sectional view of the cuter plate carrier shown in FIG. 3 along a line IV—IV in FIG. 3.

FIGS. 2 to 4 shows a lockup clutch 40' which is a modification of the embodiment form shown in FIG. 1. The lockup clutch 40' of FIGS. 2–4 has driver projections 86' that are lengthened beyond the final outer plate 88 and beat radially inward in the area of the free end to form bent axial ends 110. In this embodiment, the annular abutment element 100', like the outer plates 88, has counter-driver projections 91 which mesh in a tooth-like manner with the driver projections 86' extending substantially axially and accordingly position the annular abutment element 100' at the housing cover 14 so that the annular abutment element 100 is fixed with respect to rotation relative to the housing cover 14. A retaining ring 112 is positioned between the bent axial ends 110 of the driver projections 86' and the abutment element 100'. The retaining ring 112 is arranged there, for example, after all of the inner plate 80 and outer plates 88 are installed and accordingly blocks the axial movement of the abutment element 100' to achieve the required frictional contact-pressing pressure between the individual friction surfaces of the outer plates 88 and the inner plates 80.

It is noted that the annular abutment elements 100 in FIG. 1, and 100' in FIG. 2 also may have the effect of one of the outer plate 88 since it like the outer plates 88, is connected with the housing 12 so as to be fixed with respect to rotation relative to it.

FIGS. 3 and 4 show the outer plate carrier 82' used in the embodiment form according to FIG. 2. This outer plate carrier 82' also has an essentially annular body region 84' which has a substantially U-shaped cross sectional profile including an inner leg or annular area 114 and an outer leg or annular area 116 which are connected by a substantially radially extending web area 118. The individual driver projections 86' which terminate in the bent axial ends 110 proceed from the outer annular area 116. FIG. 4 shows intermediate spaces 87 formed between the individual driver projections 86' which allow fluid present in the interior of the converter to pass directly through the friction surface arrangements formed by the outer plates 80 and the inner plates 80.

The outer plate carrier 92' show in FIGS. 3 and 4 may be drawn from a sheet metal blank in a multiple-step deep-drawing process.

Figure 5:
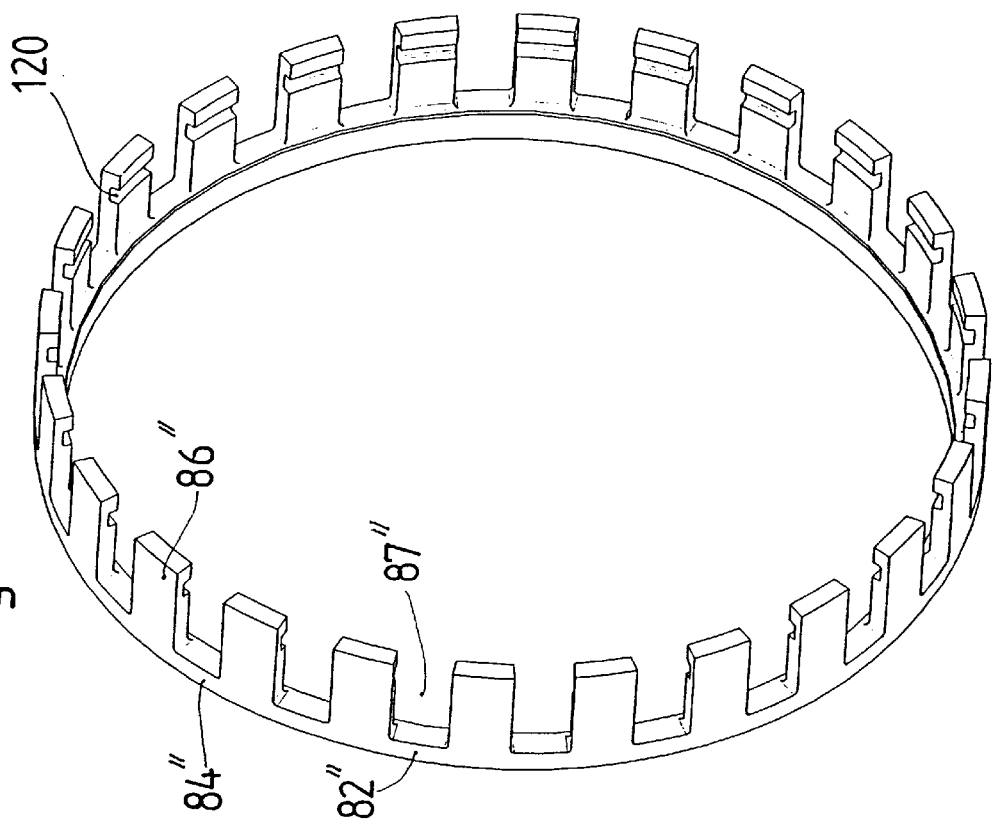
FIG. 5 is a perspective view of an alternative embodiment of the outer plate carrier to be inserted in the lockup clutch of FIG. 2.

FIG. 5 shows an alternative outer plate carrier 82" which can likewise be used in the lockup clutch 40' shown in FIG. 2. In this embodiment, the annular body region 84" of the outer plate carrier 82" is constructed, together with the individual driver projections 86", as a solid structural component pan, for example, as an impact rotating part. Grooves 120 are arranged in the end areas of the individual driver projections 86" which extend in the circumferential direction and which are open toward a radial inner side. Accordingly, the retaining ring 112 snap into these grooves 120. In other respects, the function of the outer plate carrier 82" corresponds to that of the outer plate carrier 82' shown in FIGS. 3 and 4.

Figure 6:
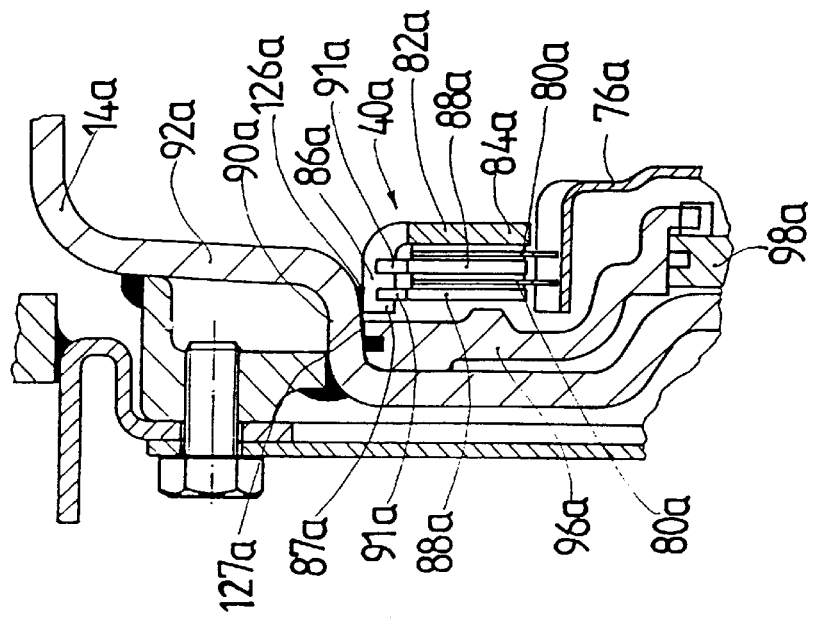
FIG. 6 is a detailed sectional view of a lockup clutch according to another embodiment of the present invention.

FIG. 6 shows a modified embodiment form in which components corresponding to those described above are designated by the same reference numbers with the addition of a suffix "a"

In the embodiment of FIG. 6, an outer plate carrier 82a has a body region in the form of a disk ring 84a that simultaneously focus an abutment area for the inner and outer plates 80a, 88a. Driver projections 86a which are bent axially proceed from this disk-ring-shaped body region 84a in the radial outer area and internediate spaces 87a are again formed between these driver projections 86a. The counter-driver projections 91a of the outer plates 88a engage these intermediate spaces 87a. An outer surface 126a of the driver projections 86a contacts an inner surface 127a of the substantially cylindrically extending portion 90a of the housing cover 14a in the area of their free ends. The transitional area between the substantially cylindrically or axially extending area 90a and the substantially radially extending area 92a of the housing cover 14a forms a wedge-shaped or angled running together of the outer surfaces 126a of the driver projections 86a and the inner surface 127a of the housing cover 14a. Accordingly, the driver projections 86a may be welded to the inner surface of the substantially cylindrically or axially extending area 90a of the housing cover 14, preferably by means of a laser welding process using a focusing effect. In this embodiment, the radial outer side of the clutch piston 96a is supported at the cylindrical inner surface 127a of the portion 90a of the housing cover 14a. This embodiment form has the advantage that it provides a very simple construction with very few structural component parts. At the same time, a high degree of strength and therefore reliable operation are provided.

Figure 7:
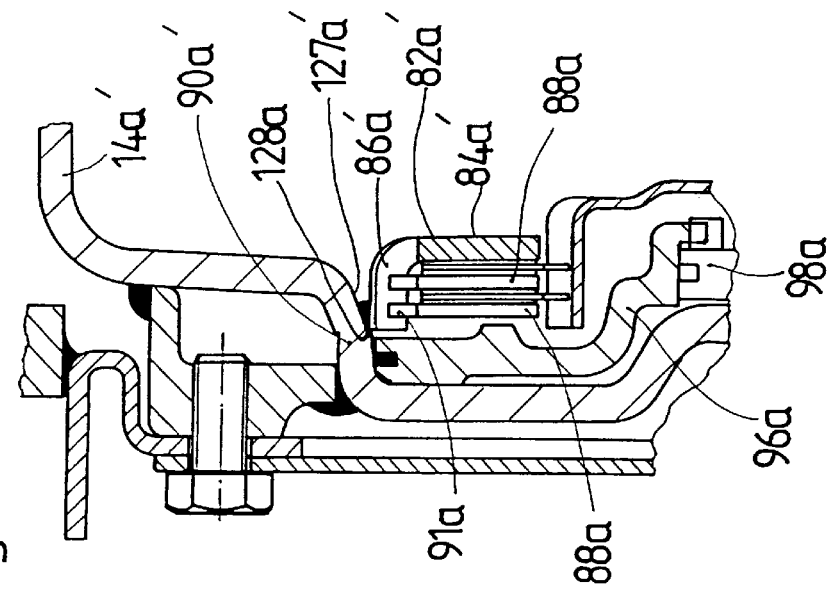
FIG. 7 is a detailed sectional view of a lockup clutch according to another embodiment of the present invention.

FIG. 7 shows a modification of the embodiment form according to FIG. 6. In this case, driver projections 86a' again proceed from a disk-ring-shaped body region 84a' of a outer plate carrier 92a'. FIGS. 8 and 9 show that the driver projections 86a' have a greater circumferential spacing and that a fastening projection 122a is located between every two driver projections 86a' in the circumferential direction. Respective outer surfaces 124a of the fastening projections 122a are arranged at a greater radial distance from the axis of rotation (A) than the corresponding outer surfaces 126a' of the driver projections 86a'. In this embodiment form, the outer surfaces 124a of the fastening projections 122a contact the inner surface 127a' of the substantially racially extending portion 90a' of the housing cover 14a'. A contact shoulder 128a is arranged on the housing cover 14a' for receiving the fastening projections 122a. Ale contact shoulder 128a is formed by a non-cutting shaping process during production of the housing cover 14a', so that a defined positioning of the outer plate carrier 82a' may be achieved with respect to the housing cover 14a'. Also, the fastening projections 122a are laser-welded to the housing cover 14a while making use of a focusing effect. Aside from the radial centering of the outer plate carrier 82a', which is also already present in the embodiment form according to FIG. 6, the shoulder 128a further provides for a preset axial positioning of the outer plate carrier 82a'. Assembling accuracy is thereby appreciably increased, Since the area where the outer plate carrier 82a' is joined to the housing cover 14a' is a greater distance from the outer plates 88a and the inner plates 80a than in the embodiment according to FIG. 7, especially at friction facings which may possibly be provided at the latter, there is a slight risk that spray generated during the welding process may reach these facings and damage them. Furthermore, the circumferential spacing of the individual driver projections 86a is greater than in the previous embodiments because a fastening projection 122a" is arranged between each adjacent pair of driver projections in the circumferential direction. Accordingly, the counter-driver projections 91a have a greater circumferential extension at the outer plates 88a, so that they are essentially enclosed between two driver projections 86a so as to be free of movement play.

A further modified outer plate carrier 82a" is shown in FIGS. 10 to 12 In this embodiment form, individual fastening projections 122a" are not axially bent, but rather extend approximately radially outward. Outer surfaces 126a" of driver projections 86a" contact the inner surface 127a" of the axially extending portion 90a" of the housing cover 14a". The fastening projections 122a" contact the surface of the substantially radially extending area 92a" of the housing cover 14a". in this case, again, a contact shoulder 128a' in the form of an annularly extending, stepped countersink is formed to provide additional positioning accuracy or centering for the outer plate carrier 82a". In this construction, laser welding is used for fastening projections 122a. In this case, two weld seams or rows of weld points may be provided. One of these rows of welds or weld seams may be used in a simple manner for preliminary fastening and the other may then provide for the final fastening. This embodiment form has the advantage that there are no welding processes carried out in the area of the surface at which the clutch piston 96a is supported toward the radial outer side, so that it van be additionally ensured that the dimensional accuracy provided during the production of the housing cover 14a' is maintained.

Figure 13:
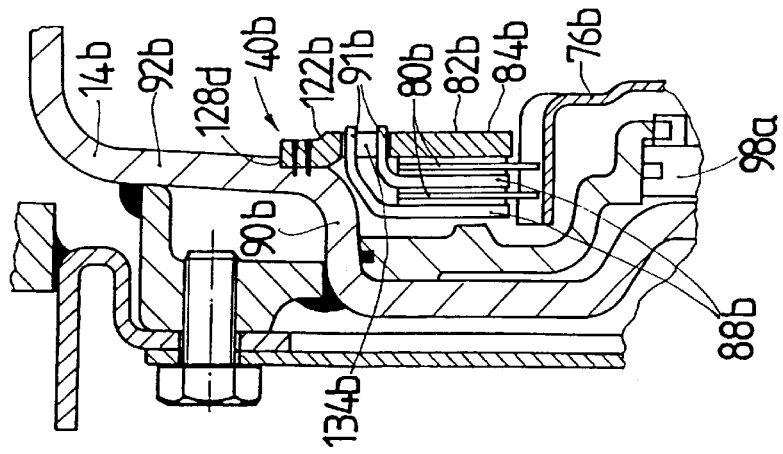
FIG. 13 is detailed sectional view of a lockup clutches according to another embodiment of the present invention.

In the embodiment form according to FIG. 13, which essentially corresponds to the embodiment form described above with reference to FIGS. 10 to 12, the dimensioning between the individual fastening projections 122a" on the one hand and the contact shoulder 128a" on the other hand is carried out in such a way that a slight radial distance is produced between the contact shoulder 128a" and the outer ends of the fastening portions 122a' when driver projections 86a" contact the cylindrical portion 90a'. A hollow weld may be introduced within this slight spacing, which leads to a very stable configuration because of the excellent strength of the connection. Centering of the outer plate carrier 82a" is accomplished by the driver projections 86a" contacting the housing cover 14a".

Figure 14:
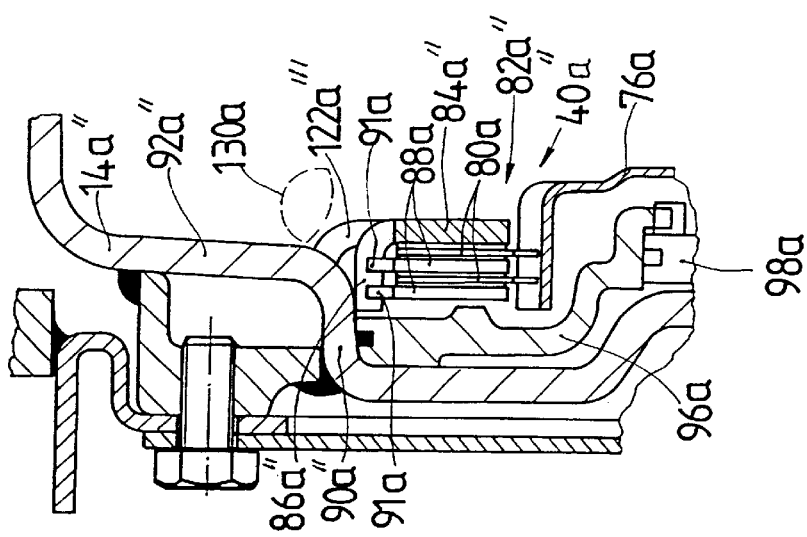
FIG. 14 is a detailed sectional view of a lockup clutch according to another embodiment of the present invention.

In this embodiment form according to FIG. 14, the fastening projections 122a'" which, proceeding from the body region 84a" of the outer plate carrier 82a", first extend radially outward and then in a curved manner and at an inclination with respect to the radial line, are butt-welded at the curved transitional area between the axially extending portion 90a" of the housing cover 14a" and the radially extending portion 92a". In this case, the welding is effected at an inclination from outside, wherein a focusing effect may be used when carrying out a laser welding process because of the cover area extending at an inclination. This embodiment form has the advantage that additional installation space for other components such, for example, as a torsional damper arrangement 130a (shown schematically) or the like, is provided here in the radial outer area.

Figure 15:
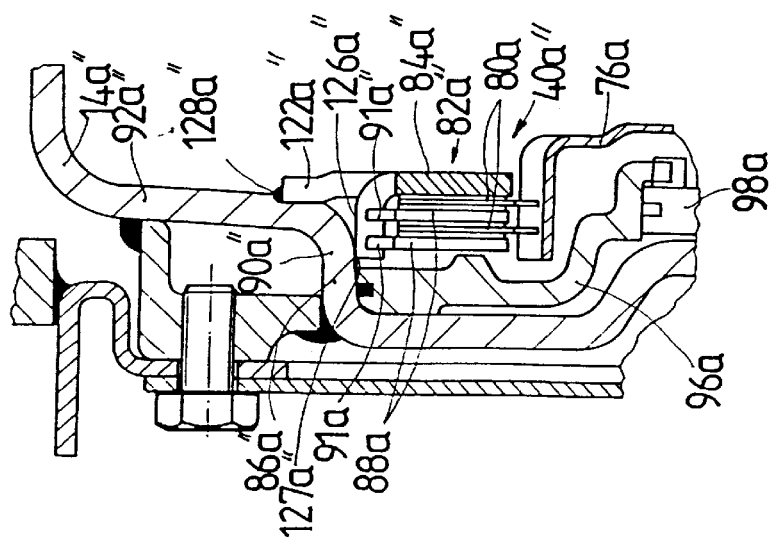
FIG. 15 is a detailed sectional view of a lockup clutch according to yet another embodiment of the present invention.

An alternative constructional type for a lockup clutch is shown in FIG. 15. Components which correspond to components described above with respect to construction and operation are designated by the same reference numbers with the addition of a suffix "b".

In this embodiment form, an outer plate trier 82b is constructed substantially in the shape of an annular disk. A radial inner area 84b of the outer plate carrier 92b forms an abutment surface for outer plates 88b and inner plates 80 b. As in the embodiment form according to FIG. 10, a radial outer annular portion 122b of the outer plate carrier 82b is secured to the radially extending portion 92b of the housing cover 14b by laser welding. A contact shoulder 128b in the radially extending portion 92b centers the outer plate carrier 82b with respect to the housing cover 14b.

A plurality of driver openings 134b are provided in the outer plate carrier 82b distributed in the circumferential direction, wherein the counter-driver projections 91b of the outer plates 88b engage in the driver openings 134b. The counter-diver projections 91b which are arranged successively in the circumferential direction and are associated unto the driver openings 134b are bent and extend substantially axially toward or through the outer plate carrier 82b. Therefore, differently configured outer plates 88b are required to guide the counter-driver projections 91b of a plurality of outer plates 88b into the same driver openings 134b. Outer plates 88b that are at a greater distance axially from the outer plate carrier 82b have counter-driver projections 91b which extend in a greater arc on the outer plate carrier 82b than an outer plate 88b situated closer to the outer plate carrier 82b. In principle, however, it would also be possible to position different driver openings 134b so as to be distributed in the circumferential direction for different outer plates 88b, so that the counter-driver projections 91b of different outer plates 88b alternate in the circumferential direction. Therefore, the same outer plates 88b may be used and would only have to be installed so as to be turned with respect to one another.

The outer plate carrier 82b shown in FIG. 15 has the advantage that it is constructed in a very simple manner because essentially only one stamped past needs to be provided, in which the driver openings 134b can also be introduced at the same time in a stamping process. It is no longer necessary to subject this part to a deep-drawing process as well.

The present invention provides a hydrodynamic torque converter having a lockup clutch with an outer plate carrier that allows the passage of cooling fluid to the individual plates of the lockup clutch without elaborate technical manufacturing measures. A high positioning accuracy may also be achieved because of the different possibilities for centering the outer plate carrier with respect to the housing on the one hand and by means of providing a contact shoulder on the other hand. Since the outer plate carrier is welded to the inner surface of the housing or housing cover by a laser welding process, no subsequent machining processes are required. It is not necessary to take any steps to restore a dimensional accuracy once it has been adjusted. A configuration is provided which is very spatially compact and constructed in a simple manner, so that it is also less prone to malfunction and more installation space can be provided for other components. It will be seen that the entire lockup clutch may be received in an annular bulge area of the housing cover. It is noted that the outer plate carrier need not be joined directly to the housing cover. Rather, the outer plate carrier may also be joined with the intermediary of some type of connection component. The support element for the clutch piston may be secured to the radial central area of the housing cover at the same time that the outer plate carrier is fastened to the housing, which further simplifies production. Since welding by laser also takes place in this area, which produces a welding area which is very exactly defined and limited spatially, the fluid duct configuration provided for the passage of fluid is not impaired by the welding process.

It is further noted that the sets of outer plates and inner plates need not have the number of plates shown in the drawings. For example, three or four outer plates and inner plates can be provided. Alternatively, only one of each plate may also be provided. Furrier, it is possible for the operation of the friction surface arrangement which is provided by the outer plates to be provided exclusively through the abutment area at which an inner plate is then supported, which inner plate is pressed against this abutment area directly by the clutch piston. Therefore, it is self-evident that, within the meaning of the present invention, providing a friction surface arrangement associated with the housing and providing an abutment arrangement does not necessarily involve different components or different structure component parts. Rather, the function of the friction surface arrangement may be integrated in one arrangement, namely, the abutment arrangement.

The invention is not limited by the embodiments described above which are presented as examples only but can be modified in various ways within the scope of protection defied by the appended patent claims.

We claim:

1. A hydrodynamic torque converter, comprising:
   a converter housing rotatable about an axis of rotation;
   a turbine wheel rotatably arranged in said converter housing for rotation relative to said converter housing about said axis of rotation of converter;

a lockup clutch comprising a first friction surface arrangement arranged on a first friction surface carrier arrangement that is fixed with respect to rotation relative to said converter housing and a second friction surface arrangement arranged on a second friction surface carrier arrangement operatively connected to said turbine wheel for transmitting rotational torque to said turbine wheel, a contact pressing arrangement axially movably mounted in said converter housing and operable for pressing said first friction surface arrangement against said second friction surface arrangement and thereby producing a torque transmission connection between said converter housing and said turbine wheel, and an abutment arrangement arranged in a fixed axial portion relative to said converter housing for supporting said first and second friction surface arrangements during production of said torque transmission connection, wherein said first friction surface carrier arrangement comprises a substantially annular body region connected in a fixed position relative to said converter housing and driver projections proceeding from said annular body region and arranged in succession at a distance from each other along a circumferential direction of said body region and defining spaces therebetween, said first friction surface arrangement comprising respective counter-driver projections which are received in said spaces between said driver projections of said first friction surface carrier arrangement, and wherein said converter housing comprises a substantially axially extending portion, a substantially radially extending portion, and a transitional area arranged therebetween, said first friction surface carrier arrangement being connected via a welded connection to said converter housing, and wherein said welded connection is proximate said transitional area.

2. Hydrodynamic torque converter of claim 1, wherein said annular body region comprises a radial supporting surface supporting a radially outer end of said contact pressure arrangement.

3. A hydrodynamic torque converter, comprising:

a converter housing rotatable about an axis of rotation;

a turbine wheel rotatably arranged in said converter housing for rotation relative to said converter housing about said axis of rotation of converter;

a lockup clutch comprising a first friction surface arrangement arranged on a first friction surface carrier arrangement that is fixed with respect to rotation relative to said converter housing and a second friction surface arrangement arranged on a second friction surface carrier arrangement operatively connected to said turbine wheel for transmitting rotational torque to said turbine wheel, a contact pressing arrangement axially movably mounted in said converter housing and operable for pressing said first friction surface arrangement against said second friction surface arrangement and thereby producing a torque transmission connection between said converter housing and said turbine wheel, and an abutment arrangement arranged in a fixed axial portion relative to said converter housing for supporting said first and second friction surface arrangements during production of said torque transmission connection, wherein said first friction surface carrier arrangement comprises a substantially annular body region connected in a fixed position relative to said converter housing and driver projections proceeding from said annular body region and arranged in succession at a distance from each other along a circumferential direction of said body region and defining spaces therebetween, said first friction surface arrangement comprising respective counter-driver projections which are received in said spaces between said driver projections of said first friction surface carrier arrangement, said annular body region having a radial inner area with an abutment arrangement for the friction surface arrangement and a radial outer area operatively arranged for securing said annular body region to a component of said hydrodynamic torque converter.

4. A hydrodynamic torque converter, comprising:

a converter housing rotatable about an axis of rotation;

a turbine wheel rotatably arranged in said converter housing for rotation relative to said converter housing about said axis of rotation of converter;

a lockup clutch comprising a first friction surface arrangement arranged on a first friction surface carrier arrangement that is fixed with respect to rotation relative to said converter housing and a second friction surface arrangement arranged on a second friction surface carrier arrangement operatively connected to said turbine wheel for transmitting rotational torque to said turbine wheel, a contact pressing arrangement axially movably mounted in said converter housing and operable for pressing said first friction surface arrangement against said second friction surface arrangement and thereby producing a torque transmission connection between said converter housing and said turbine wheel, and an abutment arrangement arranged in a fixed axial portion relative to said converter housing for supporting said first and second friction surface arrangements during production of said torque transmission connection, wherein said first friction surface carrier arrangement comprises a substantially annular body re,ion connected in a fixed position relative to said converter housing and driver projections proceeding from said annular body region and arranged in succession at a distance from each other along a circumferential direction of said body region and defining spaces therebetween, said first friction surface arrangement comprising respective counter-driver projections which are received in said spaces between said driver projections of said first friction surface carrier arrangement, said annular body region being arranged in said converter housing such that said spaces defined between said driver projections allow a radial flow of hydraulic fluid therethrough thereby allowing a suitable flow of the hydraulic fluid around said first and second friction surface arrangements.

* * * * *